(12) United States Patent
Watanabe et al.

(10) Patent No.: US 6,507,728 B1
(45) Date of Patent: Jan. 14, 2003

(54) RADIO TRANSCEIVER AND A METHOD OF PREVENTING TRANSMISSION SPURIOUS RESPONSE

(75) Inventors: Nozomu Watanabe, Tokyo (JP); Yuji Yajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/354,341

(22) Filed: Jul. 16, 1999

(30) Foreign Application Priority Data

Jul. 27, 1998 (JP) .......................................... 10-211538

(51) Int. Cl.$^7$ ............................. H04B 1/44; H04B 1/10; H04B 1/18
(52) U.S. Cl. .................. 455/78; 455/126; 455/271; 455/282; 455/284; 455/304
(58) Field of Search ................................ 455/78, 82, 83, 455/126, 271, 280, 282, 283, 284, 296, 303, 304, 305, 114; 333/12, 100, 101, 124, 126, 129, 132, 136

(56) References Cited

U.S. PATENT DOCUMENTS

| | | | | |
|---|---|---|---|---|
| 3,021,521 A | * | 2/1962 | Hutchins | |
| 4,725,842 A | * | 2/1988 | Mayberry | 342/198 |
| 4,968,967 A | * | 11/1990 | Stove | 342/165 |
| 5,444,864 A | * | 8/1995 | Smith | 455/84 |
| 5,815,803 A | * | 9/1998 | Ho et al. | 455/78 |
| 6,067,448 A | * | 5/2000 | Ho et al. | 455/78 |
| 6,208,135 B1 | * | 3/2001 | Shattil | 324/225 |
| 6,229,992 B1 | * | 5/2001 | McGeehan et al. | 455/78 |

FOREIGN PATENT DOCUMENTS

| | | |
|---|---|---|
| JP | 56-111501 | 9/1981 |
| JP | 62-181504 | 8/1987 |
| JP | 1-260932 | 10/1989 |
| JP | 2-22931 | * 1/1990 |
| JP | 02-151130 | 6/1990 |
| JP | 02-285725 | 11/1990 |
| JP | 7-167948 | 7/1995 |
| JP | 08-79126 | 3/1996 |
| JP | 09-69803 | 3/1997 |
| JP | 9-116459 | * 5/1997 |

OTHER PUBLICATIONS

Derwent English Translation of Noriyuki (JP 9–116459).*

* cited by examiner

Primary Examiner—Nay Maung
Assistant Examiner—Miguel D. Green
(74) Attorney, Agent, or Firm—Sughrue Mion, PLLC

(57) ABSTRACT

In a radio transceiver operating in a time division duplex system, a cancellation use transmission signal which is reverse in phase and equal in amplitude to a leakage transmission signal from an antenna in the signal transmission is supplied to an input port of the receiving amplifier of a receiver connected to an antenna system applied in common to the signal transmission. The transmission signal is fed via a circulator, which separates a transmission and reception path, to the antenna. The leakage transmission signal from the antenna is inputted via the circulator to the receiving amplifier. The cancellation use transmission signal is fed to the receiving amplifier via a second circulator which distributes the transmission signal and cancellation use signal disposed at an output side of the transmitting amplifier.

3 Claims, 4 Drawing Sheets

RADIO TRANSCEIVER AND A METHOD OF PREVENTING TRANSMISSION SPURIOUS RESPONSE

BACKGROUND OF THE INVENTION

1. Field of the Invention

The present invention relates to a method of preventing transmission spurious response in a radio transceiver, and in particular, to a method of preventing transmission spurious response in a receiver section and a radio transceiver.

2. Description of the Related Art

In a conventional transceiver using a time division duplexing (TDD) system, a transmission frequency is quite similar to or equal to a reception frequency.

Consequently, it is pretty difficult to attenuate sufficiently a component of the transmission signal which leaks into the reception signal by using only a band-pass filter.

Japanese Patent Laid-Open application No. 9-116459 describes a technology to remove such interference in a radio transceiver having an antenna used commonly for transmitting and receiving signals. According to the laid-open application, an apparatus to remove interference between transmission and reception signals operates as follows. In a transceiver in which, as shown in FIG. 1, a transmission signal fed from a transmitting section 31 via band-pass filter (BPF) 32 which limits bandwidth of transmitting signal is applied via first metallic path 41 to transmission and reception circulator 33 and guided into antenna 34 by circulator 33, and reception signal fed from antenna 34 is delivered by circulator 33 to band-pass filter 35 which passes the reception signal via second metallic path 43 and transferred to receiver section 36 after filtering.

The transceiver further comprises circulator 45 which distributes transmission signal between transmitting section 31 and circulator 33, receiver side directional coupler 44 between receiving section 36 and circulator 33 and third metallic path 42 including amplifier 51 and phase shifter 52 between circulator 45 and coupler 44. The difference between a length of the path from circulator 45 via first and second paths 41 and 42 to coupler 44 and an associated length therefrom via third path 42 to coupler 44 is set to λ/2 (λ=wavelength) or an odd-number multiple thereof so as to cancel a leakage component of the transmission signal.

The leakage component of the transmission signal flows into an input port of receiving section 36 due to, for example, a reverse directional or directive distribution of circulator 33. Using coupler 44, a leak signal from circulator 45 is regulated in amplitude and phase by amplifier 51 and phase shifter 52 to be fed via third path 42 as a transmission signal component.

The signal component cancels interference caused by the leakage transmission signal via metallic path 43 through circulator 33. This cancellation secures removal of interference between the transmission and reception signals even when these signals are similar in frequency to each other. Therefore, the radio frequency bandwidth can be efficiently used by minimizing the difference between the frequencies.

The technology of the laid-open application is effective in that the leakage transmission wave from circulator 45 is canceled through the matching operation with the path length, the amplitude, and the phase shift to resultantly suppress interference between transmission and reception. However, the laid-open application describes no measure to remove a transmission spurious response component having a frequency similar to the transmission frequency.

In the transceiver using the TDD system, when the transmission signal is transmitted, a high powered transmission signal is inputted into the receiving amplifier even if it is not supplied power yet, causing to generate a distortion due to non-linear characteristic of input stage of the receiving amplifier and generates not only expected receiving signal frequency but unexpected harmful frequencies so called as the spurious response.

Particularly, in a transceiver using two transmission frequencies at the same time, components of the two transmitting signals having different frequencies enter into a receiver thereof via unexpected routes. This causes intermodulation distortion and hence transmission spurious response.

SUMMARY OF THE INVENTION

An object of the present invention to provide a transmission spurious response preventing method in which a leakage signal due to a transmission signal sent from a transmitter with a high power is prevented by canceling the leakage signal with a signal having opposed phase and the same amplitude to the leakage transmission signal.

Another object of the invention is to provide a transceiver which operates in a time division duplex (TDD) system and has a receiving amplifier including an input port connected to an antenna system selected for a signal transmission.

The transceiver is also provided means for supplying a signal divided from the transmission signal and having the same amplitude and opposite phase to the amplitude and phase of the leakage transmission signal into the input port of the receiving amplifier which is connected to an antenna selected for the transmission, for canceling the leakage transmission signal.

The radio transceiver further includes a first circulator for separating a transmission and reception path, a transmitting amplifier, and a second circulator disposed in an outlet side of the transmitting amplifier. The transmission signal is supplied via the first circulator to the antenna, and the division of the transmission signal for use of canceling is fed via the second circulator to the receiving amplifier.

In accordance with the present invention, a radio transceiver operating in a time division duplex (TDD) transmission including: an antenna used commonly for transmitting and receiving signals; a first circulator of rotary insulating type connected to the antenna; a receiving section for receiving a signal via a first strip line and a receiving amplifier from said first circulator; a transmitting amplifier for high-frequency amplifying a transmission signal; a second circulator connected to an output port of said transmitting amplifier; a third strip line and a fourth strip line for establishing connection between a normal directivity outlet from said second circulator to said first circulator; and a sixth strip line and a seventh strip line for establishing connection between a reverse directivity outlet from said second circulator and an input port of said receiving amplifier of the receiving section.

In the transceiver, a transmission signal reached to the input port of the receiving amplifier via a first path including normal directivity outlet of the second circulator, said third strip line, said fourth strip line, reversed directivity outlet of said first circulator, said first strip line, and the input port of said receiving section, and a transmission signal reached to the input port of the receiving amplifier via a second path including the reverse directivity outlet of said second circulator, said sixth strip line, said seventh strip line, are equal in amplitude and reverse in phase to each other.

There is provided in accordance with the present invention a transmission spurious response preventing method used for a radio transceiver operating in a time division duplex (TDD) transmission, wherein the method includes the step of inputting a high-frequency signal delivered from a transmitting amplifier to an input port of a receiving amplifier of a receiving section connected to an antenna system selected for a signal transmission to cancel a leakage transmission signal by setting the amplitude of the delivered transmission signal the same to the leakage transmission signal and setting the phase of the delivered transmission signal to reversed relativity with the leakage transmission signal.

Conceptually, the transmission spurious response preventing method of the present invention is implemented in a radio transceiver operating in a TDD including a unit which supplies an input port of a receiving amplifier connected to an antenna system selected for transmission with a transmission signal having a phase inverted with respect to a phase of a leak transmission signal from the antenna so as to suppress the spurious emission component taking place in the receiving amplifier.

More specifically, as can be seen from FIG. 2, a signal from transmitting amplifier 11 is fed via a second circulator 13 and a third strip line 14 to a first switch 15. The signal is then delivered via a fourth strip line 16 and a first circulator 2 to a first antenna 1 to be sent therefrom. Or, the signal is fed via a fifth strip line 17 and a third circulator 7 to a second antenna 2 to be transmitted therefrom. In this situation, most power of the transmission signal inputted to first or third circulator 2 or 7 is supplied to the associated antenna. However, the power is partly delivered via a first strip line 3 to a first receiving amplifier 4 or via a second strip line 8 to a second receiving amplifier 9. Also in second circulator 13, the transmission signal inputted thereto is partly fed via a sixth strip line 18 to a second switch 19. Second switch 19, a third switch 21, and a fourth switch 23 operate under control of a signal from a controller 24 to couple sixth strip line 18 with a system associated with an antenna system to transmit signals. The signal inputted to second switch 19 is fed via a seventh strip line 20 to an input port of first receiving amplifier 4 or via an eighth strip line 22 to an input port of second receiving amplifier 9.

Lengths of the strip lines are determined such that a phase difference of 180° appears between the transmission signal delivered via third, fourth, and first strip lines 14, 16, and 3 to first receiving amplifier 4 and that supplied via sixth and seventh strip lines 18, 20 thereto as well as between the transmission signal fed via third, fifth, and second strip lines 14, 17, and 8 to second receiving amplifier 9 and that transferred via sixth and eighth strip lines 18 and 23 thereto. Resultantly, two transmission signals having a phase difference of 180° therebetween are inputted to an input port of each of the receiving amplifiers connected respectively to the antenna systems selected for the transmission. This resultantly attenuates power supplied to amplifiers 4 and 9 and hence prevents transmission spurious response due to signal distortion caused by amplifiers 4 and 9.

The above and other objects, features, and advantages of the present invention will become apparent from the following description with reference to the accompanying drawings which illustrate examples of the present invention.

DESCRIPTION OF THE PREFERRED EMBODIMENTS

Referring to the accompanying drawings, description will be given of embodiments in accordance with the present invention.

Figure 2:
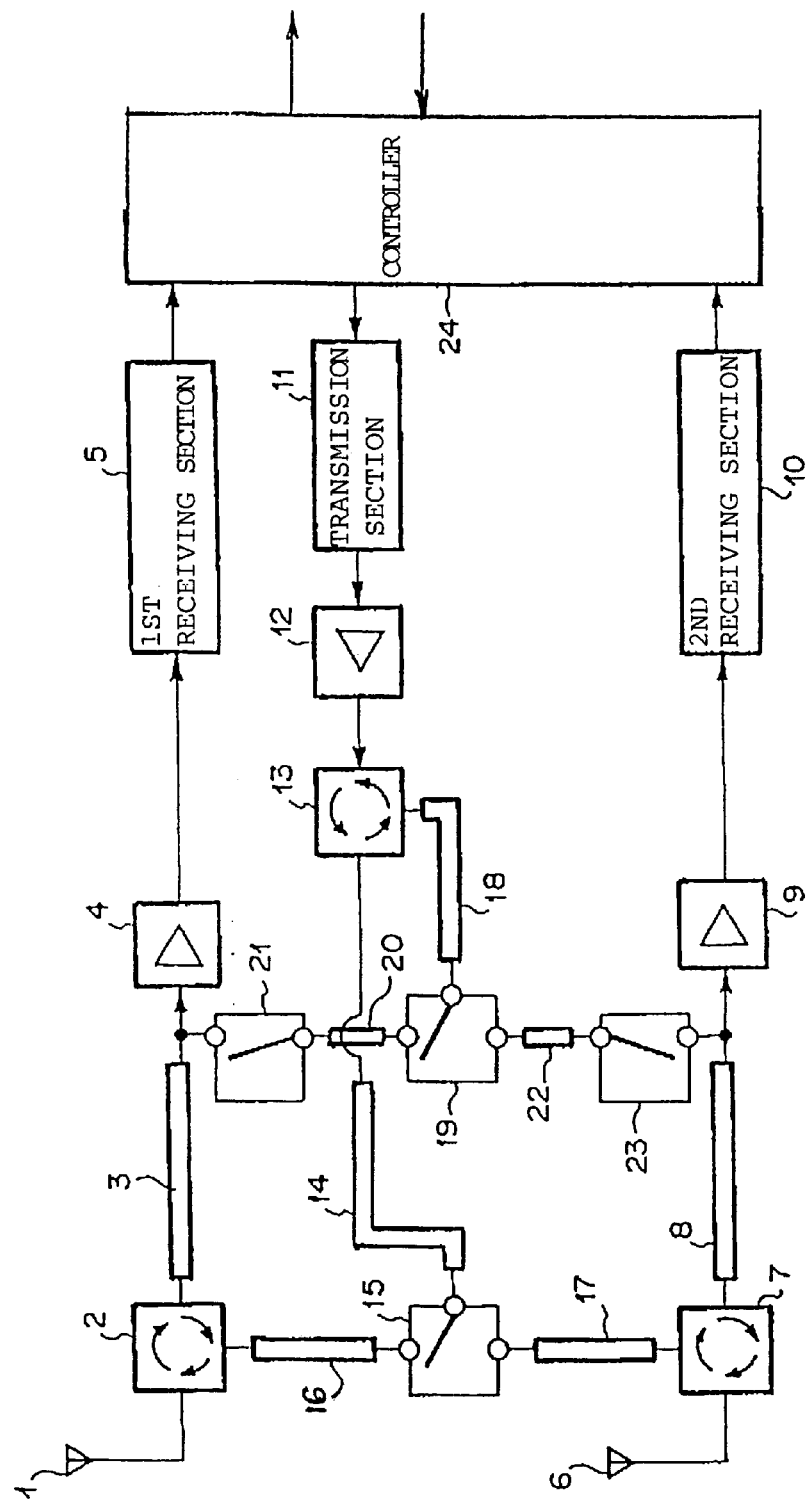
FIG. 2 is a block diagram showing a first embodiment of a radio transceiver to which a spurious response preventing method in accordance with the present invention is applied.

FIG. 2 shows in a block diagram a first embodiment of a radio transceiver to which a transmission spurious response preventing method in accordance with the present invention is applied.

FIG. 2 includes a first antenna 1 and a second antenna 6 which are used to transmit and to receive signals. The first embodiment includes two similar system blocks and hence description will be given primarily of one system thereof. Namely, the remaining system will be indicated in parentheses in the following description. First antenna 1 (second antenna 6) is connected to a first circulator 2 (a third circulator 7. First circulator 2 (third circulator 7 has, owing to its directionality or directivity, a function to transmit a received signal via a first strip line 3 (a second strip line 8) to a first amplifier 4 (a second amplifier 9) and a function to deliver a transmission signal received via a first switch 15 and a fourth strip line 16 (a fifth strip line 17) to first antenna 1 (second antenna 6).

First amplifier 4 (second amplifier 9) coupled with first strip line 3 (second strip line 8) produces an output signal, which is then fed via a first receiving section 5 (a second receiving section 10) to a control section 24 to be demodulated therein. First amplifier 4 (second amplifier 9) and first receiving section 5 (second receiving section 10) are ordinarily powered only in a signal receiving operation, namely, these units are not powered in a signal transmitting operation.

A transmitting section 11 receives a signal from controller 24 and produces a transmission signal in response to the signal and then supplies the transmission signal to transmitting amplifier 12. Amplifier 12 produces an output signal to be fed to a second circulator 13. Circulator 13 is desired to be similar to first and third circulators 2 and 7. The transmission signal inputted to second circulator 13 is fed, depending on directionality thereof, via third strip line 14 to a first switch 15, which selects a signal route or path determined by controller 24. The transmission signal is accordingly transmitted from antenna 1 or 6 as described above. Similarly, quite a little part of power of the transmission signal fed to second circulator 13 is supplied to second switch 19 via sixth strip line 18, regardless of directionality of second circulator 13.

Second switch 19 is connected, under supervision of controller 24, to a circuit system associated with an antenna to transmit signals. The transmission signal received by second switch 19 is fed via seventh strip line 20 (eighth strip line 22) to third switch 21 (fourth switch 23). In a transmission phase, third switch 21 (fourth switch 23) is in a closed state such that the transmission signal is delivered to first receiving amplifier 4 (second receiving amplifier 9). In a receiving phase, third and fourth switches 21 and 23 are not powered and hence are in released state.

In the configuration, a total length obtained by adding lengths respectively of third strip line 14, fourth strip line 16 (fifth strip line 17), and first strip line 3 (second strip line 8) to each other and a total length attained by adding lengths respectively of sixth strip line 18 to seventh strip line 20 (eighth strip line 22) are selected such that when a signal passes through these paths, signals outputted therefrom have a phase difference of 180°.

Operation of the first embodiment will be described hereunder. Table 1 shows states of switches in signal transmission and reception phases of the first embodiment.

TABLE 1

Switch control method of first embodiment of the present invention

Figure 1:
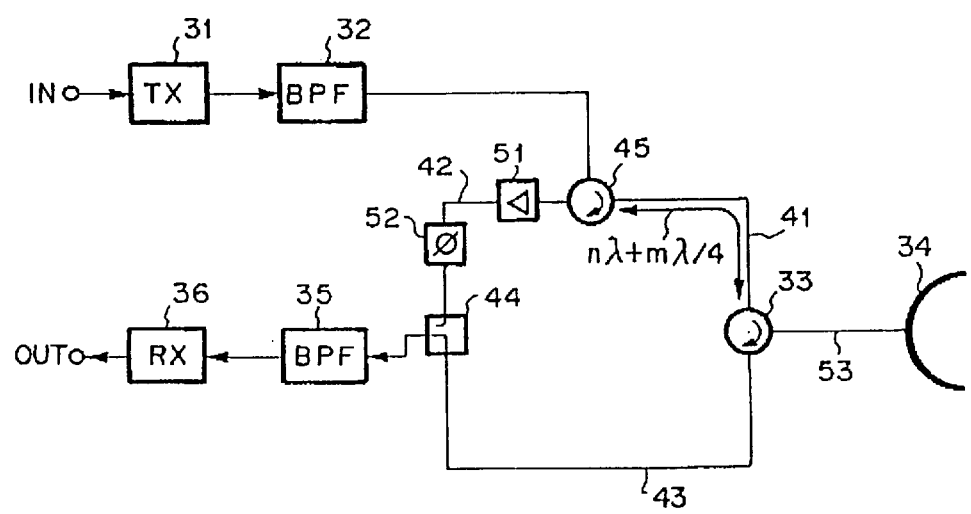
FIG. 1 is a schematic block diagram showing constitution of a general radio transceiver of the prior art.

| Switch name | Reference numeral in Fig. 1 | Transmission from 1st antenna | Transmission from second antenna | Reception |
|---|---|---|---|---|
| 1st switch | 15 | 1st antenna system selected | 2nd antenna system selected | Not specified |
| 2nd switch | 19 | 1st antenna system selected | 2nd antenna system selected | Not specified |
| 3rd switch | 21 | Not specified | Open | Open |
| 4th switch | 23 | Open | Not specified | Open |

Description will now be given of a signal transmitting operation from first antenna 1.

A transmission signal from transmitting section 11 is fed via transmitting amplifier 12 to second circulator 13. Circulator 13 includes, due to directivity thereof, two output ports for one input port, namely, an output port according to circulating directivity and an output port reverse thereto. The former causes almost no discrepancy between the input and output signals (no insertion loss) and corresponds in this system to an output port to third strip line 14. The latter causes a considerable difference between the input and output signals (i.e., isolation) and corresponds to strip line 18 in this circuit configuration.

Assuming, for example, that the output power from the transmitting amplifier is 33 dBm and the insertion loss and isolation of second circulator 13 are respectively −0.3 dB and −20 dB, then power outputted from the directivity port of second circulator 13 to third strip line 14 can be conceptually expressed as 33 dBm−0.3 dB×32.7 dBm and is fed via third strip line 14 to first switch 15.

First switch 15 is coupled with the first antenna system and hence supplies the transmission signal with a fixed insertion loss to fourth strip line 16. Assuming that first switch 15 has an insertion loss of −0.5 dB, the power of transmission signal in an input section of fourth strip line 16 is also conceptually expressed as 32.7 dBm−0.5 dB=32.2 dBm.

The transmission signal fed via fourth strip line 16 to first circulator 2 is delivered via a port associated with directivity of first circulator 2 to first antenna 1 and then is transmitted therefrom.

The signal is also delivered via the port, reverse to directivity, of first circulator 2 to first strip line 3. When first and second circulator 2 and 13 are equal in configuration to each other, the power supplied to first antenna 1 is conceptually expressed (hereinafter expressed just as same as an equation) as 32.2 dBm−0.3 dB=31.9 dBm and power to strip line 3 is expressed as 32.2 dBm−20 dB=12.2 dBm, which is supplied via first strip line 3 to an input port of first receiving amplifier 4.

On the other hand, the power from the port reverse to directivity of second circulator 13 is fed to second switch 19 as follows.

33 dBm−20 dB=13 dBm.

As can be understood from Table 1, second switch 19 is controlled in any situation to be connected to a circuit system associated with the antenna selected for the transmission. The transmission signal having passed second switch 19 becomes 13 dBm−0.5 dB=12.5 dBm to be supplied via seventh strip line to third switch 21. This switch is open in the reception phase and is closed in the transmission phase. Therefore, the signal outputted from third switch 21 has a power of 12.5 dBm−0.5 dB=12 dBm and is fed to an input port of first receiving amplifier 4.

Table 2 shows paths of transmission signals from an output port of transmitting amplifier 12 to first receiving amplifier 4.

TABLE 2

Paths of transmission signals from an output port of transmitting amplifier 12 to an input port of first receiving amplifier 4 in transmission from first antenna 1

| | Forward direction of 2ndd circulator 13 | 3rd strip line 14 | 1st switch 15 | 4th strip line 16 | Reverse direction of 1st circulator 2 | 1st strip line 3 |
|---|---|---|---|---|---|---|
| Path 1 | | | | | | |
| Variation in phase | λc1 | λ3 | λs | λ4 | λc2 | λ1 |
| Path 2 | Reverse direction of 2nd circulator 13 | 6th strip line 18 | 2nd switch 19 | 7th strip line 20 | 3rd switch 21 | |
| Variation in phase | λc2 | λ6 | λs | λ7 | λs | |

Description will now given of variation in phase of the transmission signal through two paths. Table 2 shows a quantity of phase variation λ taking place in each associated section. A phase difference λ diff1 which appears when the transmission signal passes two paths is accordingly calculated as $$\lambda\mathit{diff}1 = (\lambda c1 + \lambda 3 + \lambda s + \lambda 4 + \lambda c2 + \lambda 1) - (\lambda c2 + \lambda 6 + \lambda s + \lambda 7 + \lambda s)$$
$$= (\lambda 1 + \lambda 3 + \lambda 4) - (\lambda 6 + \lambda 7) + (\lambda c2 + \lambda s).$$

The third term, ($\lambda c2+\lambda s$), is a fixed value to be uniquely determined, so is assumed to be zero for simplifying explanation.

Then, the phase difference is reduced to $$\lambda\mathit{diff}1 = (\lambda 1 + \lambda 3 + \lambda 4) - (\lambda 6 + \lambda 7).$$

When the lengths of the strip lines are selected to set the value of $\lambda$diff1 to $180°+360°\times n$ (n=0, ±1, ±2, ±3, ...), two signals having a phase difference of 180° are supplied to the input port of receiving amplifier 4.

Specifically, for example, when the transmission signal has a frequency of 2.0 GHz and the substrate has a specific inductive capacity $\in_s$ of 4.8, the wavelength has a period $\lambda_f$ as follows.

$$\lambda_f = \text{Speed of light/frequency/}$$
$$= 30 \times 10^9/2 \times 10^9/4.8$$
$$\approx = 3.12 \text{ (cm)}.$$

Consequently, the 180° phase difference can be obtained between two signals by changing the length of the two strip lines about 1.56 cm each other.

These signals respectively have power of 12.5 dBm and 12.2 dBm and hence appropriately cancel each other due to the phase difference. In receiving amplifier 4 not powered, the resultant power is considerably less than the power which possibly causes the signal distortion. Specifically, when a high-frequency signal with high power is applied to an input stage of amplifier 4 or 9 in an inoperative state, there may appear, in addition to the fundamental transmission carrier frequency, other frequencies such as second and third harmonic components in association with cross modulation because of, for example, nonlinearity of semiconductors including p-n junctions in the input stage. Namely, the fundamental transmission carrier frequency is modulated by the transmission signal to thereby have a predetermined bandwidth, generating to a large number of spurious response components due to cross modulation.

However, when a low-power high-frequency signal is supplied to the input stage, such spurious response components are almost suppressed. But when high-frequency signals having two or more high-voltage waves are applied to the input stage of receiving amplifier 4 or 9, spurious response components are apt to appear due to intermodulation of the waves.

Table 3 shows signal paths of transmission signals from an output port of transmitting amplifier 12 to second receiving amplifier 9.

TABLE 3

Signal paths of transmission signals from an output port of transmitting amplifier 13 to an input port of second receiving amplifier 9 in transmission from second antenna 6

| Path 1 | Forward direction of 2nd circulator 13 | 3rd strip line 14 | 1st switch 15 | 5th strip line 17 | Reverse direction of 3rd circulator 7 | 2nd strip line 8 |
| --- | --- | --- | --- | --- | --- | --- |
| Variation in phase | $\lambda c1$ | $\lambda 3$ | $\lambda s$ | $\lambda s$ | $\lambda c2$ | $\lambda 2$ |
| Path 2 | Reverse direction of 2nd circulator 13 | 6th strip line 18 | 2nd switch 19 | 8th strip line 22 | 4th switch 23 | |
| Variation in phase | $\lambda c2$ | $\lambda 6$ | $\lambda s$ | $\lambda 8$ | $\lambda s$ | |

In the signal transmission from second antenna 6, a phase difference $\lambda$diff1 occurs when the transmission signal passes two paths as shown in Table 3. The value of phase difference is attained as $$\lambda\mathit{diff}2=(\lambda 2+\lambda 3+\lambda 5)-(\lambda 6+\lambda 8).$$

When the lengths of the strip lines are selected to set the value of $\lambda$diff2 to $180°+360°\times n$ (n=0, ±1, ±2, ±3, ...), the power of transmission signals in receiving amplifier 4 can be similarly set to a value considerably lower than the power which causes the signal distortion.

Figure 3:
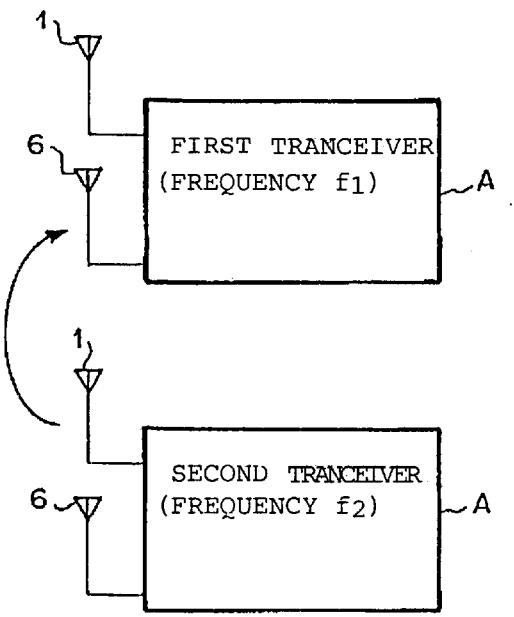
FIG. 3 is a diagram showing an embodiment including two transceivers in accordance with the present invention.
Figure 4:
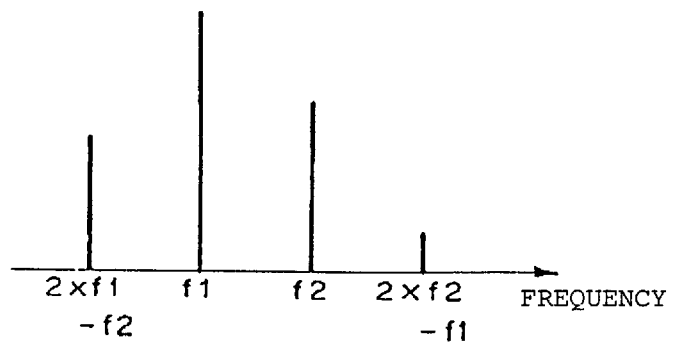
FIG. 4 is a graph for explaining signal distortion due to intermodulation in a first receiving amplifier of the transceiver before the spurious preventing method in accordance with the present invention is applied.

FIG. 3 shows an apparatus including two units of transceiver shown in FIG. 2. When an apparatus includes two or more transceivers as in this embodiment, a transmission signal of the second transceiver is supplied via antennas to the first transceiver 1. In an input section of the receiving amplifier, there exist, for example, signals respectively having frequencies f1 and f2 as shown in FIG. 3. When such signals of two frequencies are fed to receiving amplifiers 4 or 9, a distortion components of 2×f1−f2 and 2×f2−f1 take place due to intermodulation and are disadvantageously transmitted as spurious response components from the antenna.

Figure 5:
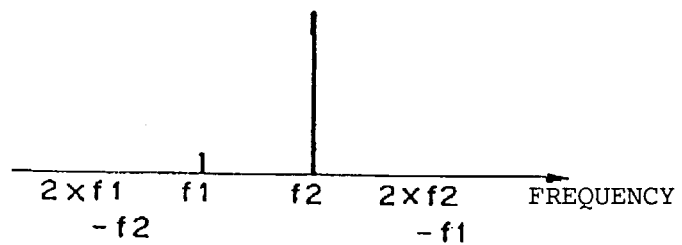
FIG. 5 is a graph for explaining signal distortion due to intermodulation in a first receiving amplifier of the transceiver after the spurious preventing method in accordance with the present invention is applied.

However, the transmission spurious response preventing method in accordance with the present invention attenuates frequency component f1 at the first transceiver as shown in FIG. 5 and suppresses the signal distortion due to intermodulation.

The advantage can be similarly attained even when a transmitting device for high-frequency signals, e.g., a coaxial cable or a micro-strip line is employed in place of the strip line in the embodiment above. In such a case, the transmission spurious response can be suppressed if there appears a phase shift of 180° between the pertinent transmission signals by appropriately setting the path lengths of coaxial cables and/or micro-strip lines.

In the embodiments above, the amplitude and phase components are adjusted by setting the path lengths of strip lines by way of example. However, a spurious preventing circuit may be arranged to suppress occurrence of spurious response with higher precision. Namely, an amplifier having a variable amplification factor and a phase shifter capable of shifting a signal phase are disposed, for example, in the section of sixth strip line 18.

Although the embodiment includes two receiving systems, the technological idea of the present invention is applicable even when the apparatus includes one transmitting system and one receiving system. Even in a transceiver including one transmission system and a plurality of receiving systems, when a leakage transmission signal sent from an antenna system to each receiving amplifier and an input signal obtained from the transmission signal via a reverse directivity output port of a circulator at an output side of a transmitting amplifier are equal in an amplitude level to each other and have a phase difference of 180° (i.e., reverse in phase to each other), it is possible to desirably suppress spurious response in the signal transmission.

Figure 6:
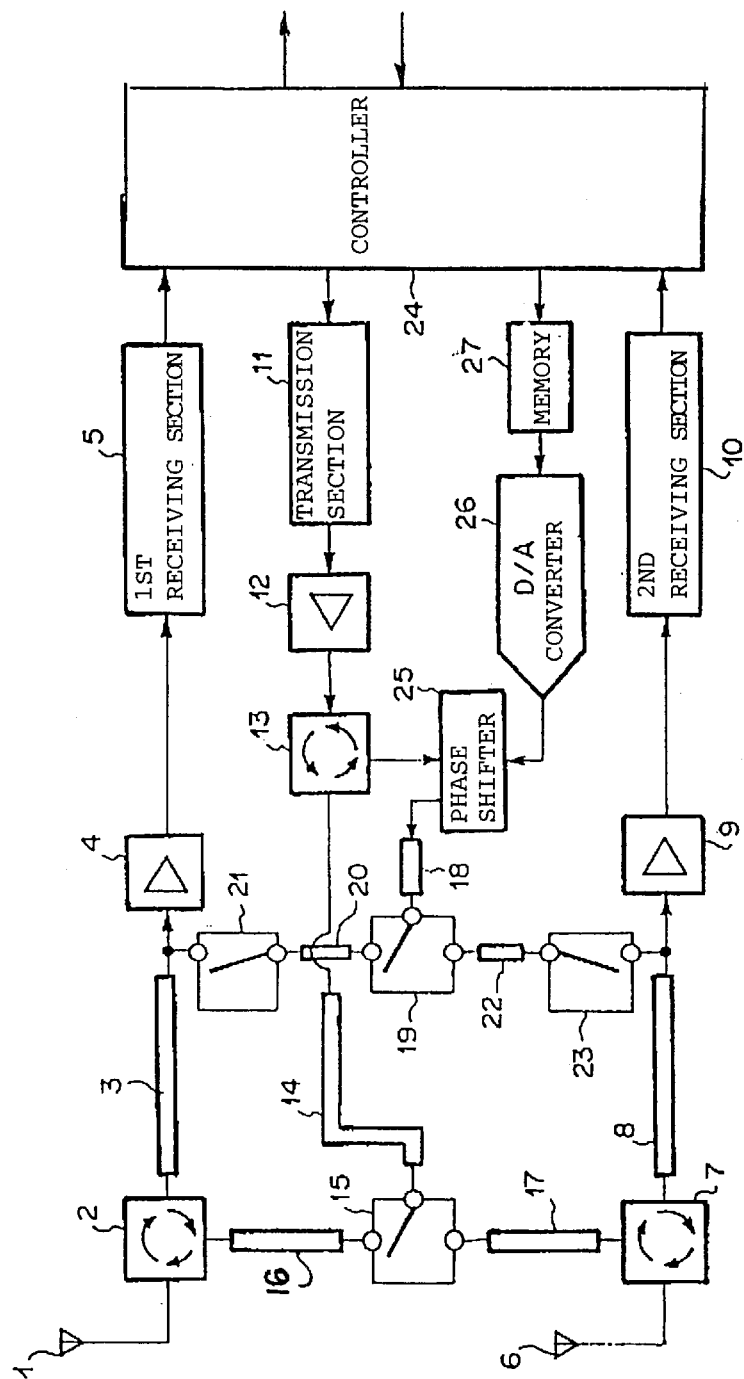
FIG. 6 is a block diagram showing structure of a second embodiment of the radio transceiver in accordance with the present invention.

FIG. 6 shows a configuration including additional constituent components to cope with a situation in which the phase adjustment cannot be achieved only by the strip lines.

The second embodiment shown in FIG. 6, differs from the first embodiment shown in FIG. 2, includes a memory 27 to store data from controller 24, a digital-to-analog (D/A) converter 26 to convert digital data of memory 27 into analog data, and a phase shifter 25.

The other components are the same as those shown in FIG. 2.

In operation of the second embodiment shown in FIG. 6, phase shifter 25 changes a phase of received signals according to the converted analog voltage outputted from D/A converter 26. D/A converter 26 produces an analog voltage in accordance with a digital signal from memory 27.

Memory 27 contains data for phase correction values necessary to produce at an input port of first receiving amplifier 4 a phase difference of 180° between two transmission signals via respective paths (i.e., reverse in phase to each other) for the case of signal transmission using first antenna 1 and data for phase correction values necessary to produce at an input port of second receiving amplifier 9 a phase difference of 180° between two transmission signals via respective paths (i.e., reverse in phase to each other) for the case of signal transmission using second antenna 6.

In response to a signal from controller 24, memory 27 outputs phase correction values corresponding to antenna 1 or 6 selected.

As described above, in an input port of a receiving amplifier of an antenna system selected to transmit signals in accordance with the present invention, for a leakage transmission signal from a point near the antenna, it is possible to simultaneously apply a transmission signal equal in power and reverse in phase to the leakage transmission signal.

These signals cancel each other and the transmission signal inputted to the receiving amplifier becomes very small in the signal transmission. This therefore suppresses an event of a signal distortion which cannot be conventionally prevented only by interrupting power to the receiving amplifier.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio transceiver operating in a time division duplex (TDD) system, comprising:

an antenna applied commonly for transmitting and receiving signals;

a first circulator of rotary insulating type connected to the antenna;

a receiving section for receiving a signal via said first circulator through a first strip line and a receiving amplifier;

a transmitting amplifier for high-frequency amplifying a transmission signal;

a second circulator connected to an output port of said transmitting amplifier;

a third strip line and a fourth strip line for establishing connection from a normal directivity outlet of said second circulator to said first circulator; and a sixth strip line and a seventh strip line for establishing connection from a reverse directivity outlet of said second circulator to an input port of said receiving amplifier, wherein a leakage transmission signal reached to the input port of the receiving amplifier via a first path which consists of normal directivity outlet of the second circulator, the third and fourth strip lines, the first circulator, the reverse directivity outlet of the first circulator and the first strip line and a distributed transmission signal reached to the input port of the receiving amplifier via a second path which consists of reverse directivity outlet of the second circulator, the sixth strip line and seventh strip line have the same amplitudes and opposite phases each other.

2. A radio transceiver in accordance with claim 1, further including a phase shifter between the reverse directivity outlet of said second circulator and said sixth strip line for adjusting a predetermined phase difference.

3. A radio transceiver in accordance with claim 1, further including:

a first switch having a predetermined loss inserted between said third strip line and said fourth strip line; and a second switch having a predetermined loss inserted between said sixth strip line and said seventh strip line.

* * * * *